US010095351B2

(12) United States Patent
Ding et al.

(10) Patent No.: US 10,095,351 B2
(45) Date of Patent: Oct. 9, 2018

(54) SUBSTRATE, DISPLAY DEVICE AND FORCE IDENTIFICATION METHOD

(71) Applicants: BOE Technology Group Co., Ltd., Beijing (CN); Beijing BOE Optoelectronics Technology Co., Ltd., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Wei Liu, Beijing (CN); Pengpeng Wang, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 15/399,353

(22) Filed: Jan. 5, 2017

(65) Prior Publication Data
US 2017/0285840 A1  Oct. 5, 2017

(30) Foreign Application Priority Data

Mar. 31, 2016  (CN) .......................... 2016 1 0201696

(51) Int. Cl.
G06F 3/041 (2006.01)
G06F 3/045 (2006.01)
G06F 3/044 (2006.01)

(52) U.S. Cl.
CPC ............ *G06F 3/0416* (2013.01); *G06F 3/044* (2013.01); *G06F 3/045* (2013.01); *G06F 3/0412* (2013.01);
(Continued)

(58) Field of Classification Search
None
See application file for complete search history.

(56) References Cited

U.S. PATENT DOCUMENTS

2010/0123686 A1* 5/2010 Klinghult .............. G06F 3/0412
345/178
2011/0057898 A1  3/2011 Huang et al.
(Continued)

FOREIGN PATENT DOCUMENTS

CN  101655399 A  2/2010
CN  103454033 A  12/2013
(Continued)

OTHER PUBLICATIONS

Mar. 19, 2018—(CN) First Office Action Appn 201610201696.3 with English Tran.

*Primary Examiner* — Christopher Kohlman
(74) *Attorney, Agent, or Firm* — Banner & Witcoff, Ltd.

(57) ABSTRACT

A substrate includes a plurality of force sensitive resistors, among which at least two force sensitive resistors connected in series forms a force sensing unit, wherein the first end of the force sensing unit applied with a first voltage, and the second end of the force sensing unit applied with a second voltage which is different from the first voltage; a readout signal line tapped between two adjacent force sensitive resistors connected in series; and the force sensitive resistors are made of piezoresistive material.

14 Claims, 8 Drawing Sheets

(52) U.S. Cl.
CPC .. *G06F 3/0414* (2013.01); *G06F 2203/04105* (2013.01)

(56) References Cited

U.S. PATENT DOCUMENTS

2016/0342256 A1* 11/2016 Zhou ..................... G06F 3/0412
2017/0010723 A1* 1/2017 Smith .................... G06F 3/045

FOREIGN PATENT DOCUMENTS

| CN | 205080530 U | 3/2016 |
|---|---|---|
| TW | 201109992 A | 3/2011 |

\* cited by examiner

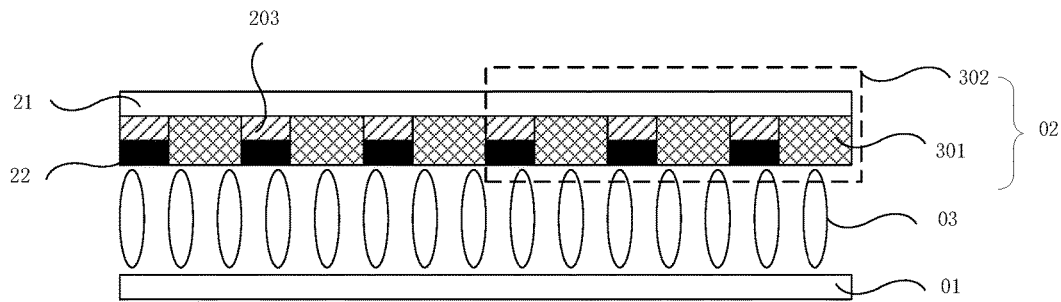

Fig. 4 applying a first voltage $V_0$ and a second voltage $V_d$ to a first end and a second end of the force sensing unit, respectively, acquiring initial voltage drops of the respective force sensitive resistor through the readout signal lines, acquiring an initial current flowing through the force sensing unit, and determining initial resistances of respective force sensitive resistors —— S101 acquiring current voltage drops on the respective force sensitive resistors through the readout signal lines, acquiring a present current flowing through the force sensing unit, determining current resistances of the respective force sensitive resistor, and comparing the current resistances with the initial resistances, determining the force sensitive resistors, the resistance of which is changed with respect to its initial resistance, being touched —— S102

Fig. 5

SUBSTRATE, DISPLAY DEVICE AND FORCE IDENTIFICATION METHOD

This application claims priority to and the benefit of Chinese Patent Application No. 201610201696.3 filed on Mar. 31, 2016, which application is incorporated herein in its entirety.

Embodiments of the present disclosure relate to a substrate, a display device and a force identification method.

BACKGROUND

Touch sensitive devices are more and more applied to the field of display technology. When a user touches a touch screen of a touch sensitive device through his finger, the touch sensitive device can sense the touch position of the finger on the touch screen and a touch pressure of the finger so that human-machine interaction can be obtained through touching images or texts on the touch sensitive screen by the user.

Taking a cell phone as an example of a touch sensitive device, as illustrated in FIG. 1, a cell phone comprises a middle bezel 103 and a touch sensitive screen 100 mounted on the middle bezel 103. In order to detect a touch pressure by a finger, the cell phone further comprises a first electrode 101 and a second electrode 102 disposed opposite to the first electrode 101, the first electrode 101 and the second electrode 102 forming a capacitor. When a user touches the touch sensitive screen 100 with various touch forces, different deformations occur to the touch sensitive screen 100, which makes the distance between the first electrode 101 and the second electrode 102 and further the capacitance of the capacitor changes. Thus, the touch force on the touch sensitive screen can be measured by detecting variation of the capacitance.

However, when touching the touch sensitive screen, no matter how much fingers press on the touch sensitive screen, only the force strength can be tested by detecting variation in the distance H between the first electrode 101 and the second electrode 102, and the number of fingers touching the touch sensitive screen cannot be determined. Thus, different commands cannot be triggered in cases of pressing the touch sensitive screen through one or more fingers, that is to say, multi-touch cannot be achieved, and commands for touch are limited.

SUMMARY

At least one embodiment of the present disclosure provides a substrate, comprising a plurality of force sensitive resistors, among which at least two force sensitive resistors connected in series forms a force sensing unit, wherein the first end of the force sensing unit applied with a first voltage, and the second end of the force sensing unit applied with a second voltage which is different from the first voltage; a readout signal line connected between two adjacent force sensitive resistors connected in series; and the force sensitive resistors are made of piezoresistive material.

At least one embodiment of the present disclosure provides a display device comprising the substrate described above.

At least one embodiment of the present disclosure provides a force identification method adapted to the display device mentioned above, the method comprising: applying a first voltage and a second voltage to the first end and the second end of the force sensing unit, respectively, acquiring a voltage drop on the respective force sensitive resistors, wherein it is determined that a force is applied on the display device where the voltage drop varies.

In one embodiment of the present disclosure, the force identification method comprising:
- acquiring an initial voltage at an output terminal of the respective force sensitive resistors so as to obtain an initial voltage drop on the respective force sensitive resistors, acquiring an initial current flowing through the force sensing unit, and determining an initial resistance of the respective force sensitive resistors on basis of the initial voltage drop and the initial current and storing the initial resistance;
- acquiring a current voltage at the output terminal of the respective force sensitive resistors so as to obtain a current voltage drop on the respective force sensitive resistors, acquiring a present current flowing through the force sensing unit, and determining a current resistance of the respective force sensitive resistors on basis of the current voltage drop and the present current and storing the current resistance;
- comparing the current resistance with the initial resistance of the respective force sensitive resistors and determining resistance variation of the respective force sensitive resistors;
- comparing the resistance variation of the respective force sensitive resistors with a threshold resistance; and
- determining the number of fingers touching on the display device on basis of distribution of resistance variations of all the force sensitive resistors.

In one embodiment of the present disclosure, the force identification method comprising:
- acquiring an initial voltage at an output terminal of the respective force sensitive resistors so as to obtain an initial voltage drop on the respective force sensitive resistors, acquiring an initial current flowing through the force sensing unit, and determining an initial resistance of the respective force sensitive resistors on basis of the initial voltage drop and the initial current and storing the initial resistance;
- detecting a touch position through a touch control element;
- acquiring a current voltage at an output terminal of the respective force sensitive resistors at the touch position so as to obtain a current voltage drop of the respective force sensitive resistors at the touch position; acquiring a present current flowing through the force sensing unit, and determining a current resistance of the respective force sensitive resistors on basis of the current voltage drop and the present current and storing the current resistance;
- calculating the maximum resistance variation of the force sensitive resistors at the touch position, and identifying a force according to the maximum resistance variation; and
- comparing the force with force level thresholds and determining a force level.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus the skilled in this art can obtain other drawings from these drawings without any inventive work.

FIG. 2b illustrates an equivalent schematic circuit of a force sensing unit of FIG. 2a;

FIG. 4 illustrates an illustrative structure of a force sensitive resistor provided on a color filter substrate according to one embodiment of the present disclosure;

FIG. 5 illustrates a flow chart of a force identification method adapted to a display device according to one embodiment of the present disclosure;

REFERENCE SIGNS 100 touch screen;
101 first electrode;
102 second electrode;
103 middle bezel of a cell phone;
20 force sensing unit;
200 substrate;
201 force sensitive resistor;
202 readout signal line;
203 sensitive wire;
301 pixel unit;
01 array substrate;
02 color filter substrate;
03 liquid crystal layer;
21 base substrate; and
22 black matrix.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
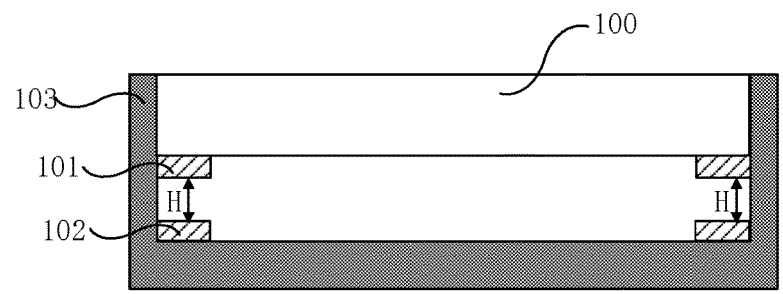
FIG. 1 shows an illustrative structure of a conventional touch sensitive display device.
Figure 2A:
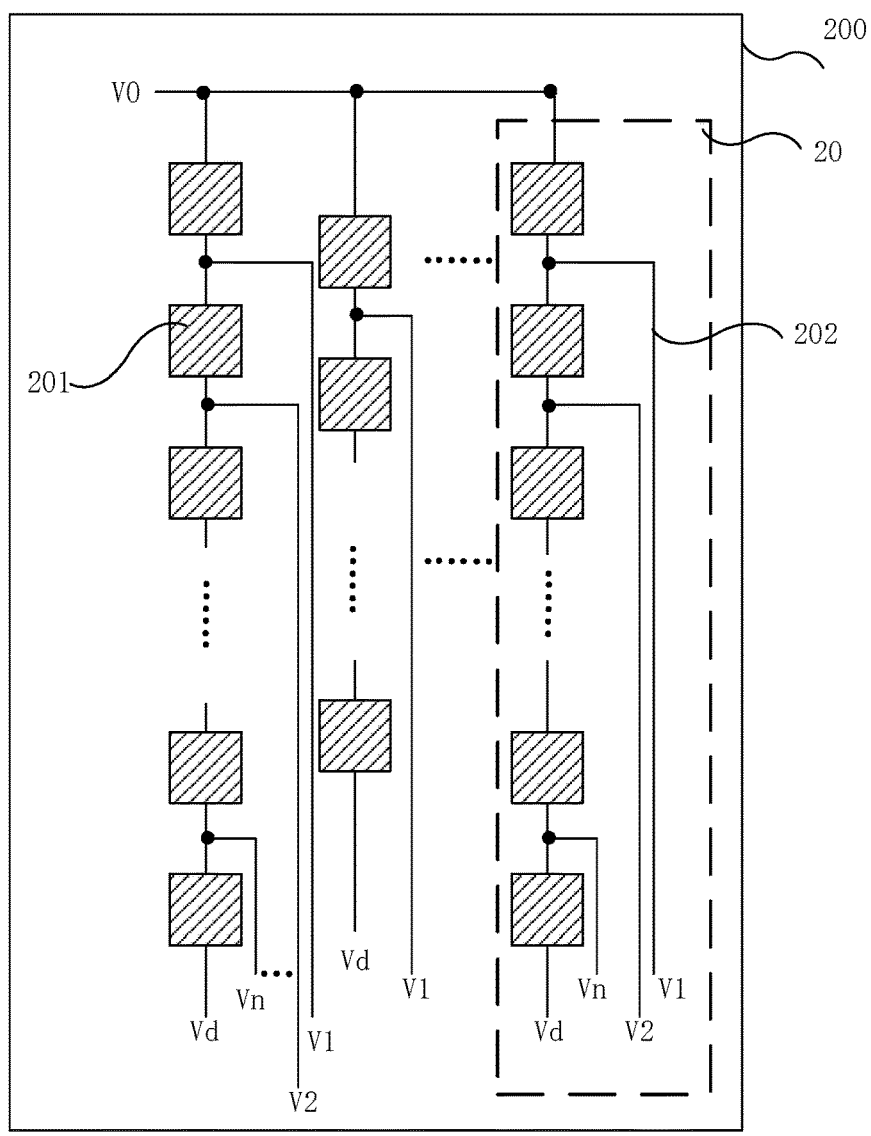
FIG. 2a illustrates an illustrative structure of a force sensitive substrate according to one embodiment of the present disclosure.

At least one embodiment of the present disclosure provides a substrate. As illustrate in FIG. 2a, the substrate comprises a base substrate 200 and a plurality of force sensitive resistors 201 formed on the base substrate 200 and made of piezoresistive material. At least two force sensitive resistors connected in series forms a force sensing unit 20, one end of which is applied with a first voltage V0 and the other end of which is applied with a second voltage Vd. And further, a readout signal line 202 is tapped at the connection of two adjacent force sensitive resistors 201 connected in series.

It should be noted that, the first voltage V0 is different from the second voltage Vd, wherein the first voltage V0 can be a high level voltage and the second voltage Vd can be a low level voltage or the ground (GND).

When a first voltage V0 and a second voltage Vd are applied, respectively, to the two ends of the force sensing unit 20 formed by a plurality of force sensitive resistors 201 connected in series, as the force sensitive resistor 201 has a resistance itself, a voltage will be dropped on each force sensitive resistor 201 among the force sensing unit 20. In such a circumstance, as the force sensitive resistors 201 are made of piezoresistive material, their respective resistance will be changed when the force sensitive resistors 201 deform due to touch by a finger, so that voltage drops on each of the force sensitive resistor 201 will be changed accordingly when being touched.

A voltage drop on each of the force sensitive resistors 201 can be calculated on the basis of the first voltage V0, the second voltage $V_d$ and voltage values readout from the readout signal lines 202 tapped at the connection of two adjacent force sensitive resistors 201 connected in series, so that it can be determined whether the voltage drop on each of the force sensitive resistors 201 is changed.

Figure 2B:
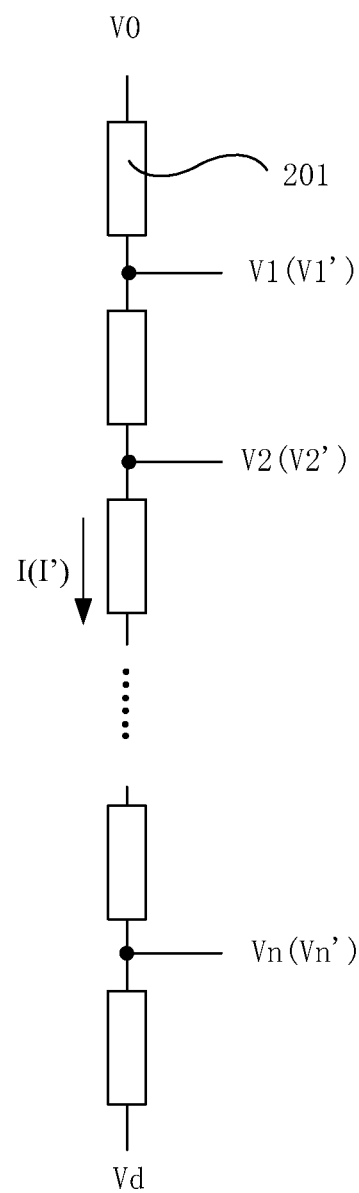

Hereinafter, how the amount of touched positions is determined is explained by taking one force sensing unit 20 as an example. In the following description, each force sensitive resistor in the force sensing unit 20 will be equivalent to a resistor, as illustrate in FIG. 2b.

A first voltage $V_0$ and a second voltage $V_d$ are applied, respectively, to the two ends of the force sensing unit 20. Before touching the base substrate 200, initial voltages $V_1$, $V_2$, ..., $V_n$ at respective outputs of the force sensitive resistors 201 connected in sequence in series are respectively readout through the readout signal lines 202. In such a circumstance, voltage drops on the force sensitive resistors 201 connected in sequence in series are $V_{c1}=V_0-V_1$, $V_{c2}=V_1-V_2$, $V_{c3}=V_2-V_3$ ..., and $V_{cn}=V_{n-1}-V_d$, respectively. At this time, a current flowing through the force sensing unit 20 is I. So, resistance of the respective force sensitive resistors 201 in the force sensing unit 20, $R_1$, $R_2$, $R_3$, ..., and $R_n$, can be calculated on the basis of calculated voltage drops and the current.

When a finger touches the base substrate 200, voltages $V_1'$, $V_2'$, ..., $V_n'$ at respective outputs of the force sensitive resistors 201 connected in sequence in series are respectively readout through the readout signal lines 202. In such a circumstance, voltage drops on the respective force sensitive resistors 201 connected in sequence in series are $V_{c1}'=V_0-V_1'$, $V_{c2}'=V_1'-V_2'$, $V_{c3}'=V_2'-V_3'$, and $V_{cn}'=V_{n-1}'-V_d'$, respectively. Then, a current flowing through the force sensing unit 20 is I'. So, resistance of the respective force sensitive resistors 201 in the force sensing unit 20, $R_1'$, $R_2'$, $R_3'$, ..., and $R_n'$, can be calculated on the basis of calculated voltage drops and the current I'.

If resistance of a force sensitive resistor 201 in the force sensing unit is changed, it can be determined that the force sensitive resistor 201 is touched by a finger.

Resistance of a force sensitive resistor 201 can be determined by the following equation:

$$R=R_0*(1+a*\Delta T)*(1+e) \quad (1)$$

wherein $R_0$ is the resistance of the force sensitive resistor 201 when not pressed, and is a known value, then, the force sensitive resistor 201 is not tensed, i.e., not pressed;

a is material temperature factor related to material properties of the force sensitive resistor 201, and is a known value;

ΔT is variation of temperature, and can be taken as a known value as the temperature of the force sensitive resistor 201 does not change before touching and after touching; and e is a tension factor of the force sensitive resistor 201 when being touched, and refers to a tension degree of the force sensitive resistor 201 when being touched, the more the value of e, the greater the force touched on the force sensitive resistor 201, and the greater the tension degree.

As described above, the resistance of the force sensitive resistor 201 is only related to the tension factor e in a linear relation. That is, the greater the force touched on the force sensitive resistor 201 by a finger, the greater the tension factor e, and the greater the resistance R of the force sensitive resistor 201.

Thus, if the resistance of the force sensitive resistor 201 is obtained, the tension factor e can be calculated directly by an equation $e=R/(R_0*(1+a*\Delta T))-1$, which is derived from equation (1), and further, magnitude of force applied on the force sensitive resistor 201 can be determined.

At least one embodiments of the present disclosure provides a substrate, comprising a plurality of force sensitive resistors, at least two of the force sensitive resistors connected in series form a force sensing unit, one end is which is applied with a first voltage and the other end of the which is applied with a second voltage different from the first voltage. A readout signal line is tapped at the connected of the two force sensitive resistors connected in series. The force sensitive resistor is made of piezoresistive material.

As the force sensitive resistor is made of piezoresistive material, its resistance will change when being touched or pressed. In such a circumstance, when the two ends of the force sensing unit consisted of at least two force sensitive resistors connected in series are applied with a first voltage and a second voltage, respectively, voltage drops on the force sensitive resistors will change while resistance of the force sensitive resistor being touched changes. A readout signal line is tapped at the connection of two adjacent force sensitive resistors connected in series. Thus, a voltage at an output terminal of a force sensitive resistor can be obtained through the readout signal line, and whether a voltage drop on the force sensitive resistor connected with the readout signal line changes or not can be determined according to signals from the readout signal line. Therefore, as the substrate comprises a plurality of readout signal lines, whether the force sensitive resistors are touched or not can be acquired on the basis of the signals from the readout signal lines. And further, the amount of finger touching on the substrate can be determined according to the amount of the force sensitive resistors resistance of which changed, so as to achieve multi-touch.

Figure 3A:
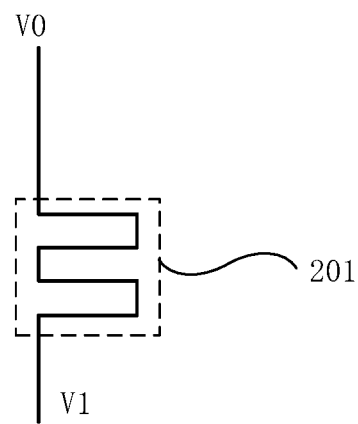
FIG. 3a illustrates an illustrative structure of a force sensitive resistor according to another embodiment of the present disclosure.
Figure 3B:
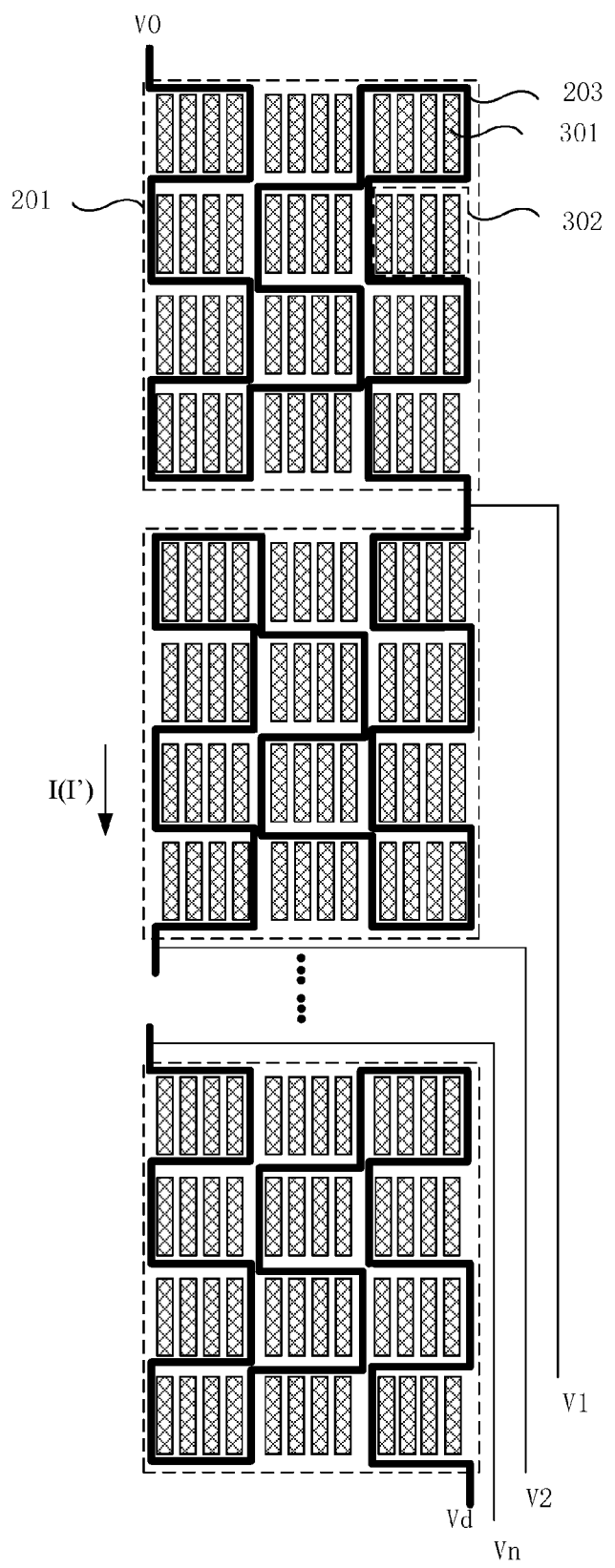
FIG. 3b illustrates an illustrative structure of a force sensitive resistor according to yet another embodiment of the present disclosure.

As the force touch technology is widely applied in display field, the substrate 200 mentioned above can be a display substrate which comprises a pixel unit 301 as illustrated in FIG. 3b.

In such a circumstance, the force sensitive resistor 201 can have a shape of plate or line, and resistance of the force sensitive resistor 201 is related to perimeters of its shape. For example, resistance R of the force sensitive resistor 201 can be derived from the equation $R=\rho L/Si$, wherein ρ is electrical resistivity of a material for the force sensitive resistor 201, L is the length of the force sensitive resistor 201, and Si is the cross sectional area of the force sensitive resistor 201.

ρ is related to a material for the force sensitive resistor 201, and is a constant value when the material is fixed. In the case that the length L of the force sensitive resistor 201 is fixed, the resistance R is inversely proportional to the cross sectional area Si, that is, the greater the cross sectional area Si, the less the resistance R.

With respect to line-shaped force sensitive resistor 201, the plate-shaped force sensitive resistor 201 has a greater cross sectional area and has a less resistance R. And variation of the resistance of the force sensitive resistor 201 is small before touching and after touching, and is difficult to be detected. Therefore, in one embodiment of the present disclosure, a force sensitive resistor 201 with a shape of line is adopted so as to facilitate detecting variation of the force sensitive resistor.

A structure of the force sensitive resistor 201 with a shape of line can be configured to in order to further increase resistance of the force sensitive resistor 201 so as to facilitate measuring the force.

For example, as illustrated in FIG. 3b, the force sensitive resistor 201 can be configured to be a sensing wire 203 disposed in a shape of continuous S.

Thus, the sensing wire 203 has a small cross sectional area Si and meanwhile the sensing wire 203 is disposed in a shape of S and the length of the sensing wire will be increased. Therefore, resistance R of the force sensitive resistor 201 can be increased further, and variation of the resistance of the force sensitive resistor 201 can be easily detected.

On the basis of the description mentioned above, when a plurality pixel units 301 comprised in the display substrate mentioned above form a pixel unit set 302 and the pixel units 301 forming the pixel unit set 302 are arranged in array, the force sensitive resistor 201 can be configured to be a sensing wire 203 with a continuous S shape disposed along peripheries of the pixel units 301 in the pixel unit set 302. As the sensing wire 203 is disposed along the peripheries of the pixel unit 301, the sensing wire 203 can be disposed at a position corresponding to a black matrix. Thus, transmittance of a display region will not be affected and affect on display effect will be avoided. Herein, that the sensing wire 203 can be disposed at a position corresponding to a black matrix means that, with respect to the substrate, the sensing wire disposed over the matrix or below the matrix.

It should be noted that, the amount of the pixel units forming the pixel unit set 302 is not limited in embodiments of the present disclosure, as long as one pixel unit set 302 comprises at least one pixel unit 301.

Figure 3C:
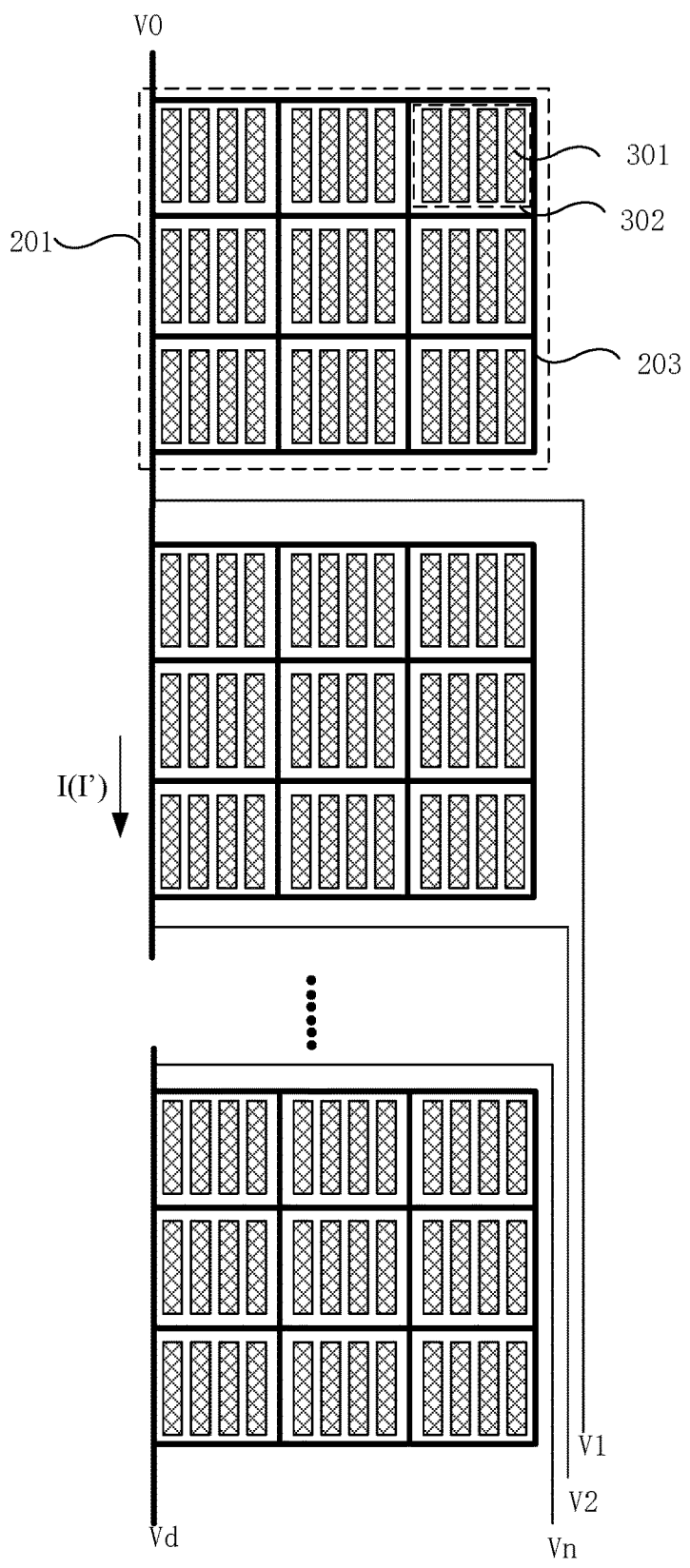
FIG. 3c illustrates an illustrative structure of a force sensitive resistor according to still another embodiment of the present disclosure.

In another embodiment of the present disclosure, as illustrate in FIG. 3c, the force sensitive resistor 201 is consisted of a plurality of closed sensing wires 203 and the plurality of closed sensing wires are connected in series. For example, the sensing wires 203 can have a closed pattern formed by lines disposed along peripheries of the pixel units 301 and arranged in grid. Thus, resistance R of the force sensitive resistor 201 can be further increased by connecting the plurality of closed sensing wires 203 in series, such that variations of resistance of the force sensitive resistor 201 can be easily detected. And further, the sensing wires 203 can be also disposed in peripheries of the pixel units 301, and can also be disposed at positions corresponding to a matrix.

When the substrate is a display substrate, the display substrate can be an array substrate 01 or a color filter substrate 02, wherein the array substrate 01 is disposed below the color filter substrate 02, and liquid crystal molecules 03 are filled between the array substrate 01 and the color filter substrate 02, and the color filter substrate 02 is disposed closer to the display side with respect to the array substrate 01. If the force sensitive resistors are disposed on the color filter substrate, sensitivity thereof for touching will be very high. Thus, the substrate can be a color filter substrate 02. In such a circumstance, as illustrate in FIG. 4, the force sensitive resistor 201 can be formed by sensing wires 203 with a continuous shape of S, and is disposed between a base substrate 21 of the color filter 02 and a black matrix 22 of the color filter substrate 02.

It should be explained that, directional or positional terms used herein, such as "over", "on", "under", "below", "left", and "right", are defined with respect to the position where the display substrate is placed schematically in the figures. And it should be noted that the directional and positional terms are relative concepts, and are used to describe relative positions of the elements which will be changed if the position where the display substrate is placed is changed.

At least one embodiment of the present disclosure further provides a display device, which comprises the substrate mentioned above. As beneficial effects of the substrate has been described in detail in the embodiments as mentioned above, and will not be elaborated here.

The display device further comprises a touch control element 500, which is configured to acquire a touch position by a finger, and can be a capacitive touch control element or a resistive touch control element.

At least one embodiment of the present disclosure further provides a force identification method adapted to the display device as mentioned above, as illustrate in FIG. 5, the method comprises:

S101, applying a first voltage $V_0$ and a second voltage $V_d$ to a first end and a second end of the force sensing unit, respectively, acquiring initial voltage drops of the respective force sensitive resistor 201 through the readout signal lines 203, acquiring an initial current flowing through the force sensing unit, and determining initial resistances of respective force sensitive resistors 201 according to the acquired initial voltage drops and the acquired current. Initial voltages on respective readout signal lines are readout, so that the initial voltage drops on the respective force sensitive resistor 201 can be determined. And then, an initial current flowing through the force sensing unit is acquired and the initial resistances of respective force sensitive resistors can be determined. The initial voltage drop refers to a voltage drop on each of the force sensitive resistor 201 when not being touched, and the initial current refers to a current flowing through the force sensing unit when not being touched.

S102, acquiring current voltage drops on the respective force sensitive resistors 201 through the readout signal lines 203, acquiring a present current flowing through the force sensing unit, determining current resistances of the respective force sensitive resistor 201 according to the acquired current voltage drop and the acquired present current, storing the current resistances, and comparing the current resistances with the initial resistances, determining the force sensitive resistors 201, the resistance of which is changed with respect to its initial resistance, being touched. The current voltage drop refers to a voltage drop on the respective force sensitive resistor 201 being touched, and the present current refers to a current flowing through the force sensing unit being touched.

When the first end and the second end of the force sensing unit 20 formed of at least two force sensitive resistor 201 connected in series are applied with a first voltage V0 and a second voltage $V_d$, resistance of the force sensitive resistor 201 being touched is changed, and meanwhile, a voltage drop on the force sensitive resistor 201 is also changed. A readout signal line 202 is tapped at the connection between two adjacent force sensitive resistor 201 connected in series, thus, a voltage at an output end of the force sensitive resistor 201 can be acquired by the readout signal line 202. A voltage drop on a force sensitive can be determined according to voltages on readout signal lines at the first end and the second end of the force sensitive resistor 201. Resistance of the force sensitive resistor can be determined according to a current flowing through the force sensing unit and the voltage drop on the force sensitive resistor. It can be determined whether a force sensitive resistor is touched on basis of variation of the resistance of the force sensitive resistor. Whether a voltage drop on a force sensitive resistor 201 is changed can be determined on basis of signals on readout signal lines 202 connected with the force sensitive resistor 201. As the substrate 200 comprises a plurality of readout signal lines 202, whether a plurality of force sensitive resistors 201 are touched or not can be determined through the plurality of readout signal lines 202. And further, the amount of fingers touching the substrate can be determined according to the amount of the force sensitive resistors 201 resistance of which varies, and the magnitude of the forces applied by the fingers can be determined according to variation of resistance of the force sensitive resistors 201.

Figure 6A:
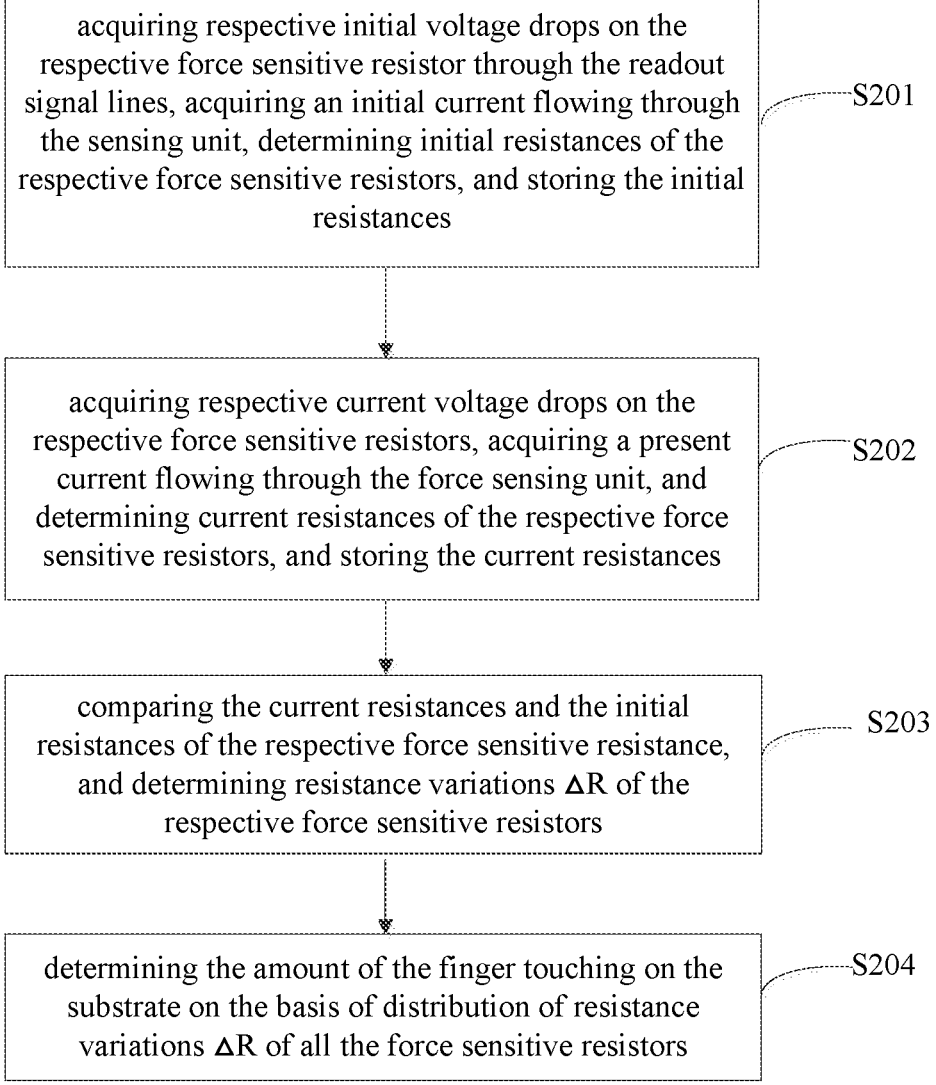
FIG. 6a illustrates a flow chart of a force identification method for acquiring the number of touch positions adapted for a display device according to the present disclosure.

Through the method for detecting the amount of fingers touching on the substrate, a method for calling commands on basis of the amount of fingers touching comprising, as illustrated in FIG. 6a:

S201, acquiring respective initial voltage drops on the respective force sensitive resistor 201 through the readout signal lines 203, acquiring an initial current flowing through the sensing unit, determining initial resistances of the respective force sensitive resistors 201, and storing the initial resistances. The initial voltage drop refers to a voltage drop on the respective force sensitive resistors 201 when not being touched, and the initial current refers to a current flowing through the force sensing unit when not being touched.

For example, when not touched by a finger, initial voltages $V_1, V_2, \ldots, V_n$ at respective outputs of the force sensitive resistors 201 connected in sequence in series are respectively readout through the readout signal lines 202. Voltage drops on the force sensitive resistors 201 connected in sequence in series are $V_{c1}=V_0-V_1, V_{c2}=V_1-V_2, V_{c3}=V_2-V_3 \ldots$, and $V_{cn}=V_{n-1}-V_d$, respectively. A current flowing through the force sensing unit 20 can be measured at the first end of the force sensing unit, at the second end of the force sensing unit, or at any position of the force sensing unit. Initial resistances of the respective force sensitive resistors can be determined according to the voltage drop and the current of the respective force sensitive resistors 201.

S202, acquiring respective current voltage drops on the respective force sensitive resistors 201, acquiring a present current flowing through the force sensing unit, and determining current resistances of the respective force sensitive resistors 201, and storing the current resistances. The current voltage drops refer to voltage drops on the respective force resistors 201 when not being touched, and the present current refers to a current flowing through the force sensing unit when being touched.

When being touched, current voltages $V_1', V_2', \ldots, V_n'$ at respective output ends of the respective force sensitive resistors 201 connected in sequence in series among the force sensing unit 20 are respectively acquired through the readout signal lines 202. Voltage drops on the respective force sensitive resistors 201 connected in sequence in series, $V_0-V_1'$), ($V_1'-V_2'$) ... ($V_n'-V_d$), are calculated. A current sensor is disposed at any position of the force sensing unit and is utilized to measure the present current flowing through the force sensing unit. Wherein, the current voltage refers to voltages at output ends of the respective force sensitive resistors 201, and the present current refers to a current flowing through the force sensing unit when being touched. The current resistances of the force sensitive resistors 201 can be determined through the current voltages drops of the respective force sensitive resistors and the present current.

S203, comparing the current resistances and the initial resistances of the respective force sensitive resistance 201, and determining resistance variations $\Delta R$ of the respective force sensitive resistors 201.

S204, determining the amount of the finger touching on the substrate on the basis of distribution of resistance variations $\Delta R$ of all the force sensitive resistors 201.

During touching, fingers press on the substrate and the substrate deforms, and the force sensitive resistors formed on the substrate deform accordingly, and a force sensitive resistor positioned at the center of the pressing region has a greatest deformation and a force sensitive resistor positioned at the border of the pressing region has a smaller deformation. Accordingly, the force sensitive resistor positioned at the center of the pressing region has a greatest resistance variation $\Delta R$, and the force sensitive resistor positioned at the border of the pressing region has a relatively smaller resistance variation $\Delta R$.

Thus, distribution of resistance variation of the force sensitive resistors formed on the substrate can be obtained on basis of the acquired resistance variation $\Delta R$ of the respective force sensitive resistors. And then, it can be determined how many local greatest resistance variations exist and thus the amount of fingers touching can be determined.

Thus, if the amount of fingers touching is determined, various commands can be called according to the amount of the fingers. For example, if a user is viewing a picture, when one finger touches the substrate, the picture will be enlarged, when two fingers touch the substrate, brightness of the picture will be increased, and when three fingers touch the substrate, the picture will be closed. So, the user can touch the substrate through different number of fingers so as to call and execute corresponding commands.

At least one embodiments of the present disclosure further provides a method for detecting a force level by a finger at a touching position, so as to achieve various force level corresponding to various commands.

Figure 6B:
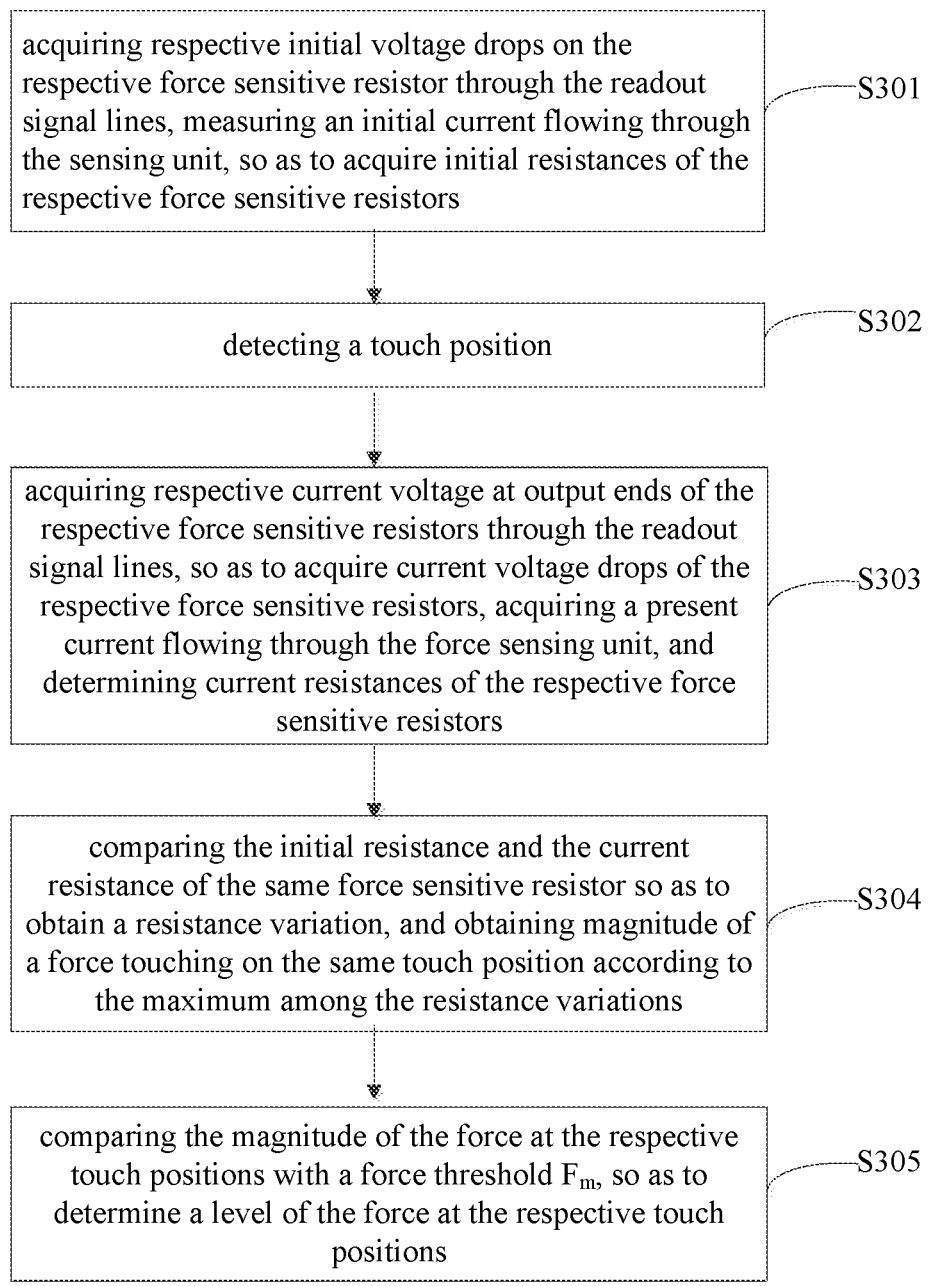
FIG. 6b illustrates a flow chart of a force identification method for determining a level of force according to one embodiment of the present disclosure.

As illustrated in FIG. 6, the method for detecting a force level by a finger at a touching position comprises:

S301, acquiring respective initial voltage drops on the respective force sensitive resistor 201 through the readout signal lines 203, measuring an initial current flowing through the sensing unit, so as to acquire initial resistances of the respective force sensitive resistors. The initial voltage drop refers to a voltage drop on the respective force sensitive resistors 201 when not being touched, the initial current refers to a current flowing through the force sensing unit when not being touched, and the initial resistance refers to a resistance of the force sensitive resistor when not being touched.

For example, when not being touched, initial voltages $V_1$, $V_2$, ..., $V_n$ at respective outputs of the force sensitive resistors 201 connected in sequence in series are respectively readout through the readout signal lines 202. Voltage drops on the respective force sensitive resistors 201 connected in sequence in series are $V_{c1}=V_0-V_1$, $V_{c2}=V_1-V_2$, $V_{c3}=V_2-V_3$ ..., and $V_{cn}=V_{n-1}-V_d$, respectively. A current flowing through the force sensing unit 20 can be measured at the first end of the force sensing unit, at the second end of the force sensing unit, or at any position of the force sensing unit. Initial resistances of the respective force sensitive resistors can be determined according to the voltage drop and the current of the respective force sensitive resistors 201, and can be stored. The current flowing through the force sensing unit can be measured by a current sensor provided at the first end of the force sensing unit, at the second end of the force sensing unit, or at any position of the force sensing unit.

S302, detecting a touch position.

For example, a touch position by a finger can be detected and acquired by the touch control element 500 of the display device.

S303, acquiring respective current voltage at output ends of the respective force sensitive resistors 201 through the readout signal lines 202, so as to acquire current voltage drops of the respective force sensitive resistors 201, acquiring a present current flowing through the force sensing unit 20, and determining current resistances of the respective force sensitive resistors 201. Wherein the current voltage drop, the present current and the current resistance are defined as above, and will not be elaborated here.

For example, when being touched, current voltages $V_1'$, $V_2'$, ..., $V_n'$ at respective output ends of the respective force sensitive resistors 201 connected in sequence in series among the force sensing unit 20 are respectively acquired through the readout signal lines 202. Voltage drops on the respective force sensitive resistors 201 connected in sequence in series, $V_0-V_1'$), ($V_1'-V_2'$) ... ($V_n'-V_d$), can be determined. A present current flowing through the force sensing unit is measured. The current resistance of the respective force sensitive resistors 201 is determined and stored.

S304, comparing the initial resistance and the current resistance of the same force sensitive resistor 201 so as to obtain a resistance variation, and obtaining magnitude of a force touching on the same touch position according to the maximum among the resistance variations.

The initial resistances of the respective force sensitive resistors 201 can be obtained according to the initial voltages $V_1$, $V_2$, ..., $V_n$ at respective outputs of the force sensitive resistors 201 and the initial current flowing the force sensing unit, and the current resistances of the respective force sensitive resistors 201 can be obtained according to the current voltages $V_1'$, $V_2'$, ..., $V_n'$ at output ends of the respective force sensitive resistors 201 and the present current flowing through the force sensing unit, so that resistance variations of the respective force sensitive resistors 201 can be obtained after being touched.

On the basis of the foregoing description, according to equation (1), the resistance R of the force sensitive resistor 201 is only related to the tension factor e. So, the tension factor e of the force sensitive resistor 201 can be obtained through the resistance variation $\Delta R$ of the force sensitive resistor 201. The maximum resistance variation $\Delta R_{max}$ directly reflects the magnitude of the force, the magnitude of the force can be determined on the basis of equation (1) according to the maximum resistance variation $\Delta R_{max}$.

S305, comparing the magnitude of the force at the respective touch positions with a force threshold $F_m$, so as to determine a level of the force at the respective touch positions.

Thus, after the level of force at the touch position id determined, various levels of force calling various commands can be implemented. For example, when the user is watching a video, it can be configured that force level I corresponds to adjust volume, force level II corresponds to adjust brightness, and force level III corresponds to adjust forwarding speed. Thus, the user can apply various touch force, so as to call corresponding commands. Wherein touch forces that the force level I, the force level II and the force level III respectively correspond can be increased in sequence.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201610201696.3 filed on Mar. 31, 2016, the disclosure of which is hereby entirely incorporated by reference.

The invention claimed is:

1. A substrate, comprising:
a plurality of force sensitive resistors, among which at least two force sensitive resistors connected in series form a force sensing unit, wherein a first end of the force sensing unit applied with a first voltage, and a second end of the force sensing unit applied with a second voltage which is different from the first voltage; and
a readout signal line tapped between two adjacent force sensitive resistors connected in series, wherein the force sensitive resistors are made of piezoresistive material,
the substrate further comprising a current sensor connected with the force sensing unit in series, wherein the current sensor configured to measure a current flowing through the force sensing unit and the readout signal line is configured to read a voltage at a connection between the two adjacent force sensitive resistors.

2. The substrate according to claim 1, wherein the force sensitive resistors are formed by a sensing wire disposed in a shape of a continuous S.

3. The substrate according to claim 2, wherein the substrate is a display substrate, and the display substrate comprises a pixel unit.

4. The substrate according to claim 3, wherein the substrate comprises a plurality of pixel units forming a pixel unit set and arranged in a matrix in the pixel unit set, the sensing wire is disposed along peripheries of the pixel units in the pixel unit set to form the shape of the continuous S.

5. The substrate according to claim 1, wherein the force sensitive resistors are formed of a plurality of closed sensing wires which are connected in series.

6. The substrate according to claim 5, wherein the substrate is a display substrate, the display substrate comprises a plurality of pixel units, and each of the closed sensing wires is disposed at periphery of the respective pixel units.

7. The substrate according to claim 1, further comprising a black matrix, wherein the force sensitive resistors are disposed over the black matrix.

8. The substrate according to claim 1, wherein the substrate is a color filter substrate.

9. A display device according to claim 8, further comprising a touch control element.

10. A display device comprising the substrate according to claim 1.

11. A force identification method applicable to the display device of claim 10, comprising:

applying a first voltage and a second voltage to the first end and the second end of the force sensing unit, respectively;
through the readout signal line, acquiring an initial voltage drop of the respective force sensitive resistors, acquiring an initial current flowing through the force sensing unit, and determining an initial resistance of the respective force sensitive resistor based on the acquired initial voltage drop and the acquired initial current;
through the readout signal line, acquiring a current voltage drop of respective force sensitive resistors, acquiring a present current flowing through the force sensing unit, and determining a current resistance of the respective force sensitive resistors based on the acquired current voltage drop and the acquired present current; and
comparing the initial resistance of the respective force sensitive resistors with the current resistance of the respective force sensitive resistors, and determining a force sensitive resistor, resistance of which varies, being touched.

12. The force identification method of claim 11, comprising:
acquiring an initial voltage at an output terminal of the respective force sensitive resistors through the readout signal line so as to obtain an initial voltage drop on the respective force sensitive resistors, acquiring an initial current flowing through the force sensing unit, and determining an initial resistance of the respective force sensitive resistors based on the initial voltage drop and the initial current, and storing the initial resistance;
acquiring a current voltage at the output terminal of the respective force sensitive resistors through the readout signal line so as to obtain a current voltage drop on the respective force sensitive resistors, acquiring a present current flowing through the force sensing unit, and determining a current resistance of the respective force sensitive resistors based on the current voltage drop and the present current and storing the current resistance;
comparing the current resistance with the initial resistance of the respective force sensitive resistors and determining resistance variation of the respective force sensitive resistors;
comparing the resistance variation of the respective force sensitive resistors with a threshold resistance; and
determining a number of fingers pressing on the display device based on a distribution of resistance variations of all of the force sensitive resistors.

13. The force identification method of claim 12, wherein determining the number of fingers pressing on the display device based on the distribution of resistance variations of all of the force sensitive resistors comprises:
determining an amount of local greatest resistance variations based on the resistance variation of the respective force sensitive resistors, so as to determining the number of fingers touching.

14. The force identification method of claim 11, wherein the display device comprises a touch control element, and the force identification method comprises:
acquiring an initial voltage at an output terminal of the respective force sensitive resistors through the readout signal line so as to obtain an initial voltage drop on the respective force sensitive resistors, acquiring an initial current flowing through the force sensing unit, and determining an initial resistance of the respective force sensitive resistors based on the initial voltage drop and the initial current, and storing the initial resistance;

the touch control element detecting a touch position;
acquiring a current voltage at the output terminal of the respective force sensitive resistors through the readout signal line so as to obtain a current voltage drop on the respective force sensitive resistors, acquiring a present current flowing through the force sensing unit, and determining a current resistance of the respective force sensitive resistors based on the current voltage drop and the present current, and storing the current resistance;
calculating a maximum resistance variation of the force sensitive resistors at the touch position, and identifying a force according to the maximum resistance variation; and
comparing the force with force level thresholds and determining a force level.

* * * * *